May 10, 1949. DE FOREST C. PATMORE 2,469,665
RADIAL ADJUSTING SPROCKET
Filed Jan. 17, 1948 2 Sheets-Sheet 2

INVENTOR
De F. C. PATMORE
By: Fetherstonhaugh & Co.
ATT'YS

Patented May 10, 1949

2,469,665

UNITED STATES PATENT OFFICE 2,469,665

RADIAL ADJUSTING SPROCKET

De Forest C. Patmore, Orillia, Ontario, Canada, assignor to E. Long Limited, Orillia, Ontario, Canada Application January 17, 1948, Serial No. 2,873

7 Claims. (Cl. 74—230.18)

1

This invention relates to improvements in adjustable sprocket wheels and the like and more particularly to improvements in sprocket wheels of the type described in Canadian Patent No. 269,432.

According to the above-mentioned Canadian patent an adjustable sprocket wheel comprises a wheel body having inclined peripheral faces and tooth members adjustably secured to each inclined face and adapted to be slid therealong to alter the effective pitch circumference of the wheel.

The main difficulty arising from the use of the above mentioned type of sprocket wheel has been that whereas the tangents to the pitch lines at adjacent ends of successive tooth members are coincident at normal adjustment, upon altering the radius of the wheel by adjustment of the position of the tooth segments on the inclined faces, the tangents, although remaining parallel, become radially displaced from one another with the result that the cable passing around the sprocket wheel becomes slightly kinked on passing around the wheel. This leads to excessive wear on the cable and materially shortens the life thereof when operating with the sprocket adjusted to any material extent from normal.

The present invention overcomes the aforementioned disadvantage by forming the said inclined peripheral faces in a curve, as shall be hereinafter described, whereby the tangents of the pitch lines at the adjacent ends of successive tooth segments are coincident and remain substantially coincident throughout the range of adjustment of the tooth segments.

While the design of a sprocket wheel according to the invention may be determined geometrically, due to the number of variable factors such as the radius of the wheel, the spacing between successive buttons on the cable, the diameter of the cable, and the number of tooth segments required, it is generally more expedient to design such a sprocket for a given set of conditions by trial and error methods.

In the accompanying drawings, a sprocket wheel according to the invention is described having a given pitch circumference and a simple method of laying out the proportions of the various parts is described, which is both practical for shop purposes and easy to reproduce. It is to be understood that it is possible to design a wheel of different radius and with different numbers of teeth than those shown by varying the relevant dimensions proportionately.

Figure 3:
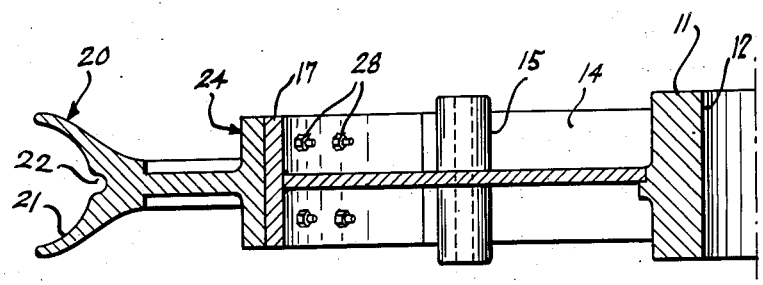
Figure 3 is a radial sectional view taken along the radius 3—3 in Figure 1.

Referring more specifically to the drawings in the embodiment shown, a sprocket wheel according to the invention comprises a wheel member 10 having a hub 11 with a central orifice 12 suitably keyseated at 13 for keying to a shaft. The wheel 10 has a plurality of radial ribs 14 for strengthening purposes, each rib having a driving bolt socket 15 and a gusset 16 for the attachment co-axially to the wheel of a driving gear. The periphery of the wheel 10 is generally ratchet shaped, each tooth being formed from a curved portion 17 and a flat portion 18, substantially at right angles to the tangent of the curve formed by the portion 17 at the end thereof and extending radially beyond the surface thereof to provide a mounting for the set screw 19. As will be appreciated from Figure 3, the entire periphery of the wheel member 10 is flangular.

Mounted on the curved portions 17 are the tooth segments 20 the peripheral portions 21 whereof are generally trough shaped and adapted to accommodate a cable in the central portion 22 of the trough. Longitudinally, the peripheral trough 21 is arcuate conforming to the pitch line 23 of the sprocket, the radius of the arc being such that the aggregate of all the segments defined by the arcs on all the tooth members is at least a complete circle. Each tooth segment 20 is provided with a shoe portion 24 which conforms to the curve of the curved portions 17 of the wheel member 10 and which is adapted to slide circumferentially along the surface 25 of the curved portion 17. A series of slots 26 are formed in the shoe portion 24 and a series of borings 27 are formed in the curved portion 17 and the retaining bolts 28 are adapted when tightened to retain the shoe 24 in fixed relation to the curved portion 17, whereas on loosening of the retaining bolts 28, the shoe 24 may be slid along the curved portion 17 in either direction to the limit of the extent of the slots 26. The set screw 19 is used in the correct positioning of the tooth segments 20 and the position of the shoe 24 on the curved portion 17 is controlled in each case by the set screw 19.

The relationship of the curved portion 17 to the pitch line 23 is such that throughout the extent of adjustment of the shoe members 24 on the curved portions 17, the tangents to the pitch lines at adjacent ends of adjacent tooth segments are substantially coincident when the tooth members are each adjusted a corresponding amount. Thus when the tooth segments 20 are adjusted to the extreme position clockwise the outline of the tooth segments 20 will assume the position 20a slightly clockwise of, and radially extending from the position normally occupied, thereby, providing a pitch line 23a outside the normal pitch line 23.

It will be appreciated that the angle which the right bi-sector of the arc formed by the curved portion 17 makes with a line joining the centre of the curved portion to the centre of the wheel may be varied without departing from the scope of the invention. Where such varying is done, however, an entire re-designing of the wheel is necessary which as aforesaid, may be most easily carried out by trial and error methods, preferably on a drafting board. The size of the angle in the sprocket wheel used as an illustration in this specification has been found to be very satisfactory and the design of the sprocket wheel illustrated will be carried out assuming a given angle, expressed in terms of the distance between the centre of the wheel and the centre of the circle of which the inclined curved surface forms a part.

Figure 1:
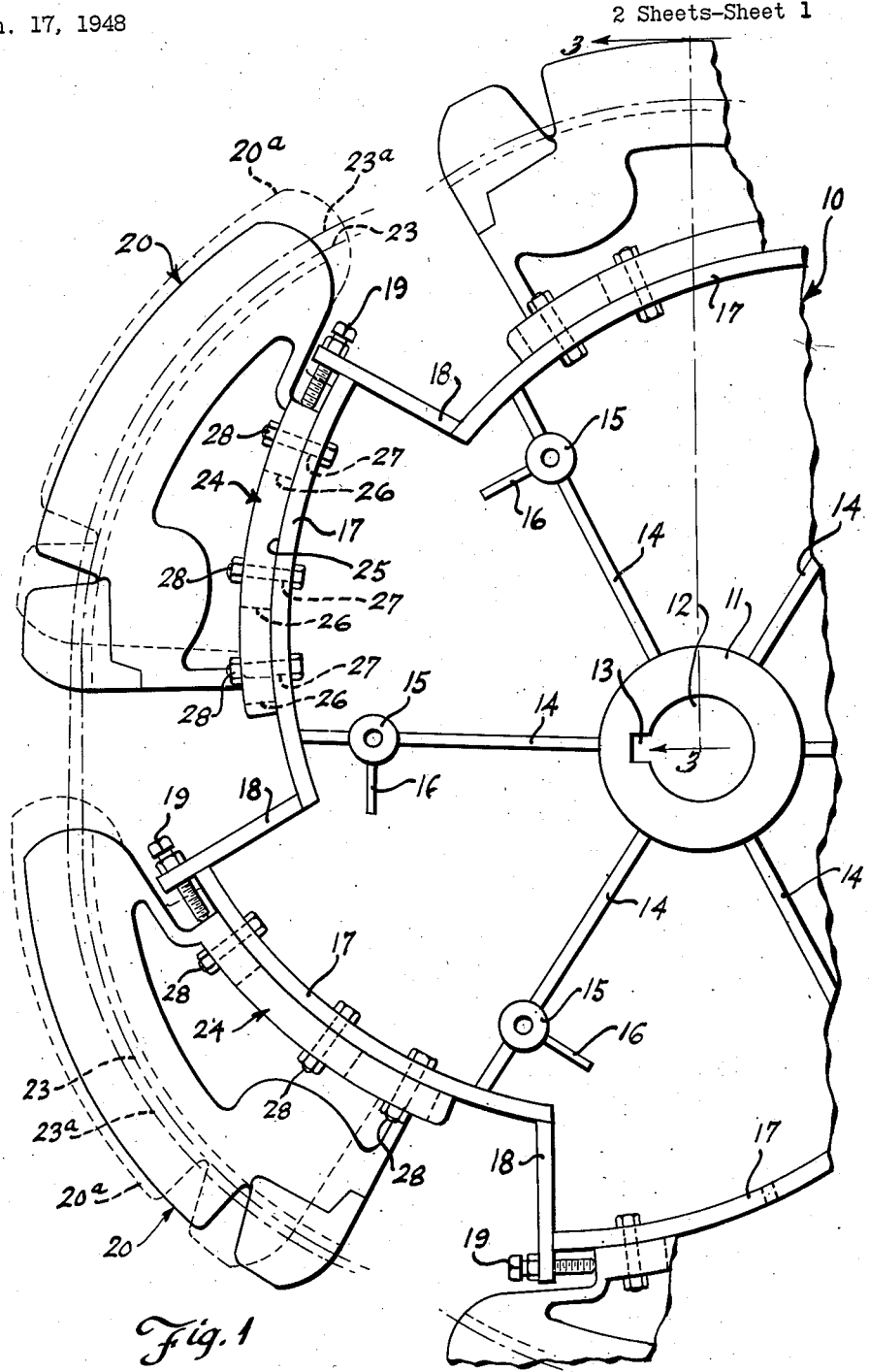
Figure 1 is a fragmentary plan view of a sprocket wheel according to the invention.
Figure 2:
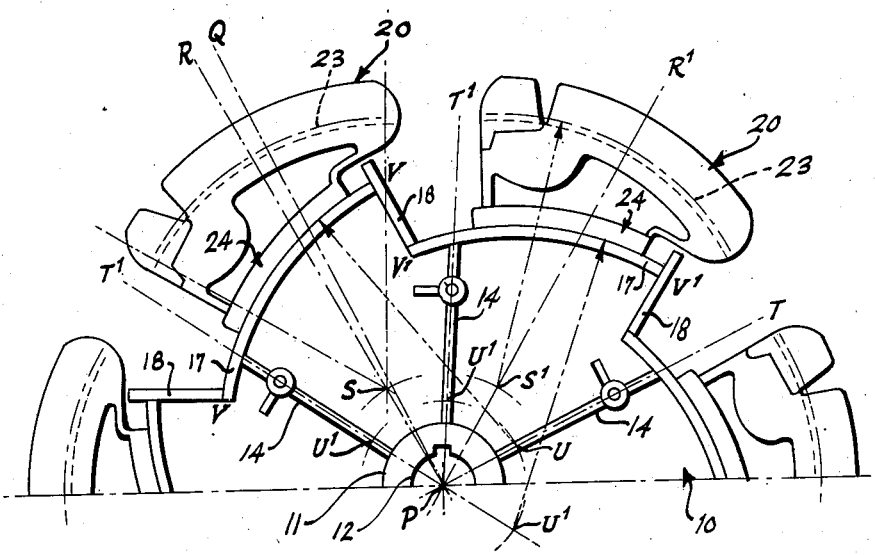
Figure 2 is a diagrammatic plan of the wheel shown in Figure 1 illustrating a method of laying out the design thereof.

A relatively simple method of laying out a sprocket wheel according to the invention is shown in Figure 2 with respect to a sprocket wheel having six tooth segments and a normal pitch circumference of 21 ft. but it will be appreciated that all the dimensions given may be varied proportionately to provide a wheel of any given dimensions.

By "pitch circumference" is meant the total length of the pitch line (when the tooth members are adjusted to the normal position) and this quantity may be determined by adding together the lengths of the pitch line arcs on all the tooth members and adding thereto six times the distance between any two consecutive tooth members. It will furthermore, be appreciated that the number of tooth segments may be varied to suit the circumstances and the wheel designed by similar methods.

To begin with, the centre P is marked off, and a reference line PQ is described. 3° to the left of the line PQ the line PM marked off, which forms a centre line for the first tooth segment and a series of lines PR1 are marked off at 60° intervals around the circle from the line PR. Using the centre P at a radius of 12 in. a circle is described intersecting the line PR at S and the lines PR1 at S1. Using the centres S and S1 and a radius of $$\frac{180}{2 \times 3.1416} \text{ in.}$$

a series of 60° arcs are marked off with their centres on the points S and S1 respectively to represent the arcuate pitch lines 23 on the tooth segments 20. The remainder of the tooth segments with the exception of the design of the shoe may be filled in to suit the particular design. A line PT is drawn at an angle of 93° from the line PR to represent the centre of a reinforcing rib 14 and a series of such lines PT1 are drawn at 60° intervals to represent the centre lines of similar ribs 14. With centre P and radius 9 in. an arc is described intersecting the line PT at U and intersecting the lines PT1 at U1. With the centre U and radius 33 in. an arc VV is described to represent the outer surface of the curved portion 17 and similar arcs V1V1 are marked off around the wheel in a similar manner using the points U1 as centres. The details of the wheel structure may now be filled in according to any desired design in accordance with the foregoing specification, to provide an arcwise adjustment of the tooth segments 20 on the curved portion 17 which moves the centre line PR of the tooth segments a suitable amount in a clockwise direction.

Thus it will be seen from the above, that once the minimum pitch circumference has been determined all the relevant dimensions may be referred thereto. Accordingly, supposing the pitch circumference at minimum adjustment to be 21 feet, once the line PR is laid off the point S will be 21 x .0475 x 12 inches along the line PR from the point P and the radius of the pitch arc is .1136 x 12 x 21 inches. Similarly, once the line PT has been laid off at 93 degrees from the line PR the point U will be a distance of .0356 x 21 x 12 inches out from the centre along the line PT and the radius used to describe the arc VV will be .131 x 21 x 12 inches.

It is well at this point to consider the factors determining the circumferential length of the tooth members and the number of tooth members required. The widest application of sprocket wheels of the type described is generally in pulpwood handling operations where a cable is used with a series of "buttons" attached to it for transporting logs along a conveyor. The distance between the "buttons" will generally determine a suitable circumferential length for the tooth members. It is desirable for instance to have the "buttons" occupy the spaces between the tooth members when passing around the sprocket although the provision of the trough shaped periphery of the tooth members provides for the accommodation of displaced buttons preventing them from disengaging the cable from the sprocket. Thus, by dividing the pitch circumference of the wheel by the distance between successive buttons on the cable we arrive at a suitable number of tooth members for the wheel and concerning this point, the actual figures given above for the design of a six-toothed sprocket will serve equally well for the design of a five or seven-toothed sprocket provided the arc drawn with centre S subtends 72° or 51.428° respectively rather than 60°. When dealing with larger or smaller numbers of teeth, the correct positioning of the point U and determination of the radius to be used for forming the arc VV is best determined by experiment on the drafting board and it should be borne in mind in this respect that errors caused by the method of design used are so minute that displacement of the tangents to the pitch line at the ends of the tooth members resultant from such errors, are inappreciable. Concerning the length of the tooth members themselves a suitable distance between tooth members is arbitrarily chosen. For a 21-foot pitch circumference wheel such a distance of 1 foot between teeth is suitable. Thus in a six-toothed wheel of the above circumference the circumference of a circle formed by the pitch arcs on all the tooth members will be 21—6 or 15 feet, and the radius of the pitch arcs will be $$\frac{15 \times 12}{2\pi}$$

or 28.64 in.

It will be seen that the above is a very simple method for designing a wheel according to the invention. Such a wheel may of course, be designed from purely geometric considerations, but it has been found from experience that the above method of design is to be preferred as being simpler and more practical.

It will be noticed that in the embodiment described the actual tooth 20 extends slightly beyond the 60° arc on either side, and the curve of the trough continues beyond the ends of the 60° arc. The pitch line is, of course straight between the ends of the 60° arc, but the extra extending curved trough provides for the case where imperfections in design or wear cause the cable to engage the extended portion outside the said arc, maintaining in such cases the necessary coincidence of the tangents to the pitch lines at the adjacent ends of the adjacent tooth segments.

It will be readily appreciated from the foregoing that we have produced an extremely simple adjustable sprocket, the pitch circumference of which may be easily adjusted without causing kinking or excessive wear to a wire rope or cable stretched therearound.

What I claim as my invention is:

1. An adjustable sprocket wheel of the kind comprising a wheel having a plurality of inclined peripheral faces, and a plurality of tooth segments adjustably secured to each inclined face and adapted to be adjusted therealong to alter the effective pitch circumference of the wheel in which said inclined faces and the cooperating portions of said tooth segments are longitudinally arcuate whereby to maintain the tangents to the pitch lines at the adjacent ends of adjacent tooth segments substantially coincident over the whole range of adjustment of said tooth segments when said adjacent tooth segments are in corresponding positions of adjustment on their respective inclined surfaces.

2. An adjustable sprocket wheel of a kind comprising a wheel body having inclined peripheral faces, one end of each face differing from the other end in radial distance from the centre of the wheel body and a tooth segment adjustably secured to each inclined face so that its position may be varied longitudinally between the ends of the inclined face wherein the said inclined faces and the cooperating parts of the tooth segments are arcuate whereby adjustment of said tooth segments along said faces a given amount does not cause the tangents of the pitch lines at adjacent ends of adjacent tooth segments to move substantially out of coincidence.

3. An adjustable sprocket wheel comprising a wheel body having a series of inclined faces spaced apart around its periphery, one end of each face differing from the other in radial distance from the centre of the wheel body and having a series of bolt orifices formed therein, a tooth segment engaging each face and provided with a flanged base having longitudinal slots formed therein, bolts extending through said orifices into the slots aforesaid and a set screw carried by the wheel body and bearing against the outer end of each tooth segment, said inclined faces and said flanged bases being longitudinally arcuate whereby upon adjustment of said tooth segments a given amount along said inclined faces the tangents to the pitch line at adjacent ends of adjacent tooth segments remain substantially coincident.

4. An adjustable sprocket as defined in claim 1 in which the circumferential portions of the tooth members are trough shaped in section, said trough being large enough to prevent a "button" on the cable from causing the cable to disengage from the sprocket.

5. An adjustable sprocket as defined in claim 4 in which the aggregate of the arcs formed by the line of the centre of the trough is more than a complete circle.

6. An adjustable sprocket wheel of the kind comprising a wheel having a plurality of inclined peripheral faces, and a plurality of tooth segments adjustably secured to each inclined face and adapted to be adjusted therealong to alter the effective pitch circumference of the wheel in which said inclined faces and the cooperating portions of said tooth segments are longitudinally arcuate whereby to maintain the tangents to the pitch lines at the adjacent ends of adjacent tooth segments substantially coincident over the whole range of adjustment of said tooth segments when said adjacent tooth segments are in corresponding positions of adjustment on their respective inclined surfaces, in which the circumferential portions of the tooth members are trough shaped in section, said trough being large enough to prevent a "button" on the cable from causing the cable to disengage from the sprocket, and in which the curvature of the pitch lines on said tooth segments is that of a circle of .1136 times the pitch circumference in radius, the centre of said circle being located, when said tooth segment is adjusted to the normal position, along a line joining the centre of the wheel to the centre of said portion of said pitch line at a distance of .0475 times the pitch circumference from said wheel centre.

7. An adjustable sprocket as defined in claim 6 in which the centre of the circle of which a given curved portion forms a part is located along a line drawn through the centre of the wheel at 93° to the lines joining the centre of the circle to the centre of said curved portion and at a distance along said line in a given direction from said wheel centre of 0.357 times the pitch circumference, the radius used to describe said curved portion being 0.131 times the pitch circumference.

DE FOREST C. PATMORE.

No references cited.